(12) United States Patent
Iizuka et al.

(10) Patent No.: US 10,799,987 B2
(45) Date of Patent: Oct. 13, 2020

(54) LASER PROCESSING APPARATUS

(71) Applicant: DISCO CORPORATION, Tokyo (JP)

(72) Inventors: Kentaro Iizuka, Tokyo (JP); Koyo Honoki, Tokyo (JP); Shuichi Torii, Tokyo (JP); Yutaka Kobayashi, Tokyo (JP); Ryohei Yamamoto, Tokyo (JP); Kazuya Hirata, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 332 days.

(21) Appl. No.: 15/881,180

(22) Filed: Jan. 26, 2018

(65) Prior Publication Data

US 2018/0214976 A1    Aug. 2, 2018

(30) Foreign Application Priority Data

Jan. 27, 2017   (JP) .................................. 2017-013073

(51) Int. Cl.
| | |
|---|---|
| *B23K 26/00* | (2014.01) |
| *B23K 26/38* | (2014.01) |
| *B23K 26/53* | (2014.01) |
| *B23K 26/04* | (2014.01) |
| *B23K 103/00* | (2006.01) |

(52) U.S. Cl.
CPC .............. *B23K 26/53* (2015.10); *B23K 26/38* (2013.01); *B23K 26/048* (2013.01); *B23K 2103/56* (2018.08)

(58) Field of Classification Search
CPC .... B23K 26/53; B23K 26/38; B23K 26/0057; B23K 26/048; B23K 2103/56
See application file for complete search history.

(56) References Cited

U.S. PATENT DOCUMENTS

| | | | |
|---|---|---|---|
| 8,134,099 B2 * | 3/2012 | Nakano | B23K 26/046 219/121.69 |
| 8,198,564 B2 * | 6/2012 | Unrath | B23K 26/0613 219/121.61 |
| 10,286,485 B2 * | 5/2019 | Lee | B23K 26/032 |

FOREIGN PATENT DOCUMENTS

| | | |
|---|---|---|
| JP | 2000-094221 A | 4/2000 |
| JP | 2013-049161 A | 3/2013 |

* cited by examiner

*Primary Examiner* — Frederick C Nicolas
(74) *Attorney, Agent, or Firm* — Greer Burns & Crain, Ltd.

(57) ABSTRACT

Disclosed herein is a laser processing apparatus for forming a separation layer inside an ingot by applying a laser beam to an end surface of the ingot in the condition where the focal point of the laser beam is set inside the ingot, the laser beam having a transmission wavelength to the ingot. The laser processing apparatus includes a holding unit for holding the ingot, a moving unit for moving the holding unit in a direction parallel to the end surface of the ingot held by the holding unit, a laser beam applying unit for applying the laser beam to the ingot held by the holding unit, an imaging unit for detecting the position of the ingot in the direction parallel to the end surface of the ingot, and a height detecting unit for detecting the height of the end surface of the ingot held by the holding unit.

6 Claims, 4 Drawing Sheets

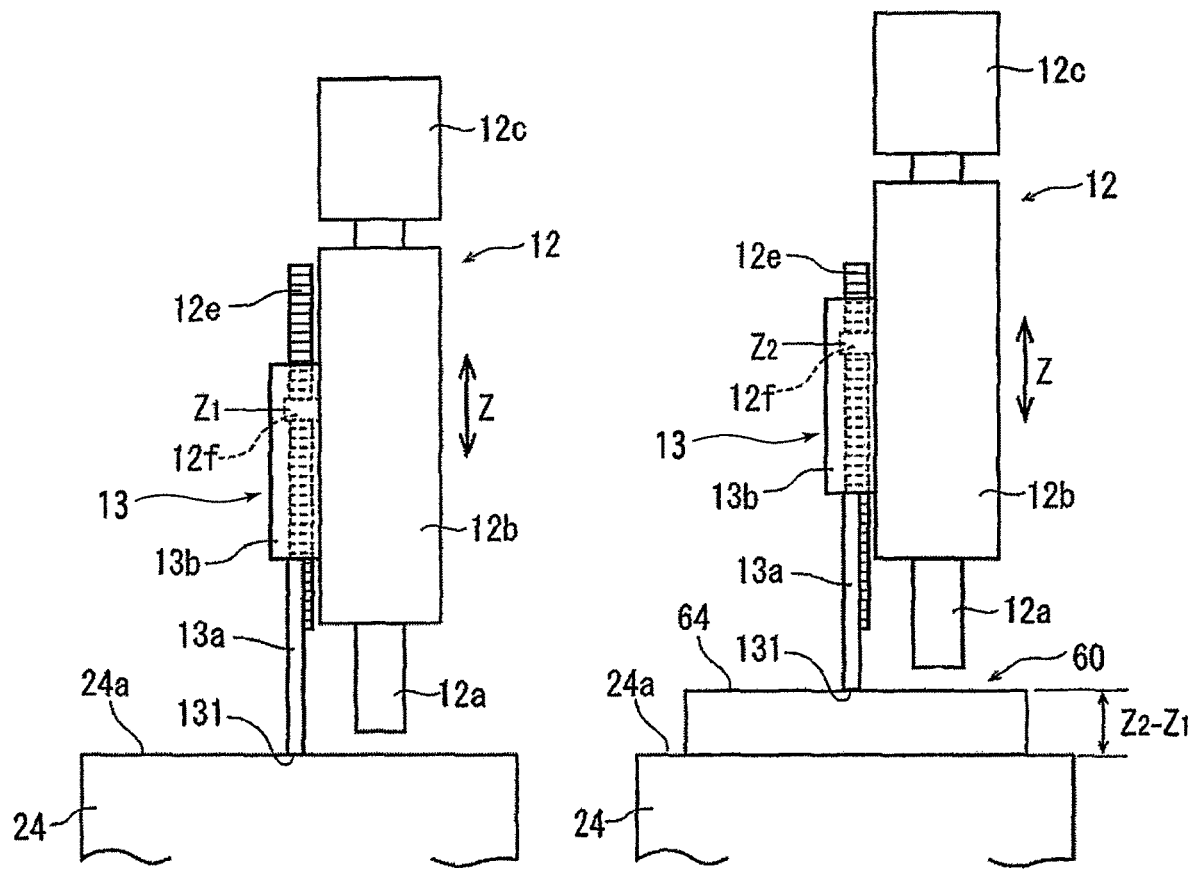

LASER PROCESSING APPARATUS

BACKGROUND OF THE INVENTION

Field of the Invention

The present invention relates to a laser processing apparatus for forming a separation layer inside an ingot by applying a laser beam to the ingot in the condition where the focal point of the laser beam is set inside the ingot, the separation layer being formed to separate a wafer from the ingot.

Description of the Related Art

Various devices such as integrated circuits (ICs), large-scale integrated circuits (LSIs), and light emitting diodes (LEDs) are formed by forming a functional layer on the front side of a wafer formed of silicon (Si) or sapphire ($Al_2O_3$) and partitioning this functional layer into a plurality of separate regions along a plurality of division lines. The division lines of such a wafer having these devices are processed by a processing apparatus such as a cutting apparatus and a laser processing apparatus to thereby divide the wafer into a plurality of individual device chips individually corresponding to the devices. The device chips thus obtained are used in various electrical equipment such as mobile phones and personal computers.

Further, power devices or optical devices such as LEDs are formed by forming a functional layer on the front side of a wafer formed of single crystal silicon carbide (SiC) and partitioning this functional layer into a plurality of separate regions along a plurality of division lines. In general, the wafer on which the devices are to be formed is produced by slicing an ingot with a wire saw. Both sides of the wafer sliced from the ingot are polished to a mirror finish (see Japanese Patent Laid-open No. 2000-094221, for example).

However, when the ingot of single crystal SiC is cut by the wire saw and both sides of each wafer are polished to obtain the product, 70% to 80% of the ingot is discarded to cause a problem of poor economy. In particular, a single crystal SiC ingot has high hardness and it is therefore difficult to cut this ingot with the wire saw. Accordingly, considerable time is required for cutting of the ingot, causing a reduction in productivity. Thus, there is a problem in efficiently producing a wafer from a single crystal SiC ingot in this prior art. In recent years, a technique for solving this problem has been proposed (see Japanese Patent Laid-open No. 2013-049161, for example). This technique includes the steps of setting the focal point of a laser beam having a transmission wavelength to single crystal SiC inside a single crystal SiC ingot, next applying the laser beam to the ingot as scanning the laser beam on the ingot to thereby form a separation layer in a separation plane previously set inside the ingot, and next separating a wafer from the ingot.

SUMMARY OF THE INVENTION

However, in producing a wafer having a predetermined thickness efficiently and accurately by applying a laser beam to the ingot to form the separation layer as mentioned above, it is necessary to consider the height of the upper end surface of the ingot. Every time the wafer is separated from the ingot, the height of the upper end surface of the ingot changes. That is, the height of the upper end surface of the ingot changes not only with the thickness of each wafer to be separated, but also with the amount of polishing the end surface of the ingot after separating each wafer. Accordingly, in separating each wafer from the ingot in the condition where the height of the upper end surface of the ingot is not accurate, there arises a problem such that the focal point of the laser beam cannot be accurately set at a predetermined depth from the upper end surface of the ingot. As a result, there is a possibility of variations in thickness of each wafer to be separated from the ingot.

It is therefore an object of the present invention to provide a laser processing apparatus which can separate a wafer having a proper thickness from an ingot by applying a laser beam to the ingot in the condition where the focal point of the laser beam is accurately set at a predetermined depth inside the ingot.

In accordance with an aspect of the present invention, there is provided a laser processing apparatus for forming a separation layer inside an ingot by applying a laser beam to an end surface of the ingot in the condition where the focal point of the laser beam is set inside the ingot, the laser beam having a transmission wavelength to the ingot, the laser processing apparatus including holding means for holding the ingot; moving means for moving the holding means in a direction parallel to the end surface of the ingot held by the holding means; laser beam applying means for applying the laser beam to the ingot held by the holding means, the laser beam applying means having focusing means for focusing the laser beam so that the focal point is movable in a direction perpendicular to the end surface of the ingot held by the holding means; imaging means for detecting the position of the ingot in the direction parallel to the end surface of the ingot held by the holding means; height detecting means for detecting the height of the end surface of the ingot held by the holding means; and focal position adjusting means for adjusting the focal point of the laser beam to a predetermined depth from the end surface of the ingot held by the holding means according to a detection value obtained by the height detecting means, the predetermined depth corresponding to the thickness of a wafer to be produced from the ingot.

Preferably, the height detecting means includes a contact terminal, a moving unit for moving the contact terminal until the contact terminal comes into contact with the end surface of the ingot held by the holding means, and a scale for detecting the position of the contact terminal. More preferably, the contact terminal is provided adjacent to the imaging means, and the scale and the moving unit are included in the imaging means.

According to the present invention, the focal point of the laser beam can be set at a desired position with reference to the accurate height of the end surface of the ingot, so that it is possible to solve the problem that the thickness of the wafer to be separated from the ingot may vary. Further, in the case that the height detecting means includes the contact terminal, the moving unit for moving the contact terminal until the contact terminal comes into contact with the end surface of the ingot held by the holding means, and the scale for detecting the position of the contact terminal, the height detecting means can be easily configured. Further, in the case that the contact terminal is provided adjacent to the imaging means, and the scale and the moving unit are included in the imaging means, the configuration of the imaging means can be used for the height detecting means, thereby suppressing an increase in cost of the laser processing apparatus.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIGS. 3A and 3B are side views for illustrating the operation of the height detecting means shown in FIG. 2A;

DETAILED DESCRIPTION OF THE PREFERRED EMBODIMENT

Figure 1:
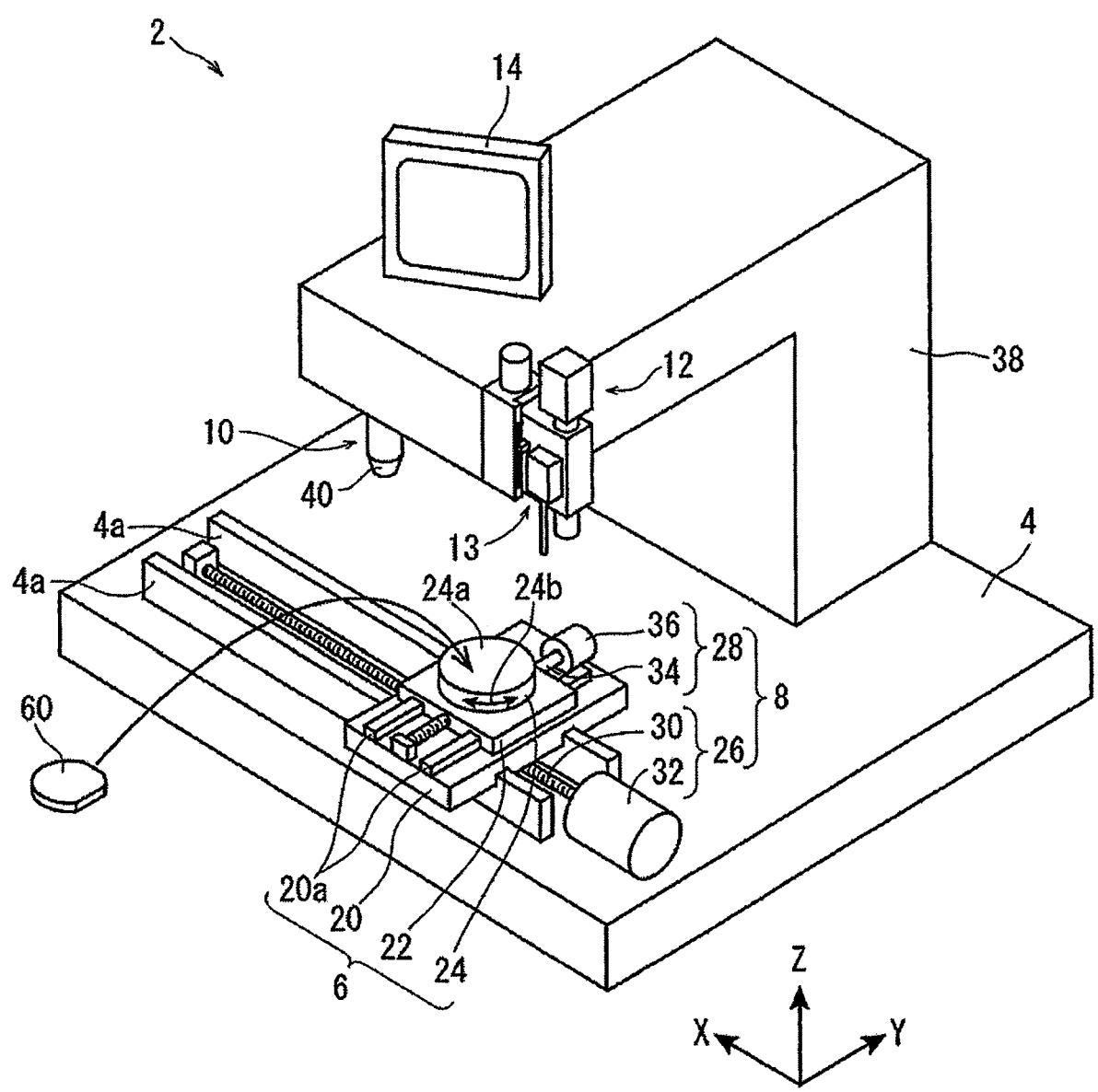
FIG. 1 is a perspective view of a laser processing apparatus according to a preferred embodiment of the present invention.

A preferred embodiment of the laser processing apparatus according to the present invention will now be described in detail with reference to the attached drawings. Referring to FIG. 1, there is shown a laser processing apparatus 2 according to this preferred embodiment. The laser processing apparatus 2 shown in FIG. 1 includes a base 4, holding means 6 for holding an ingot 60 as a workpiece, moving means 8 for moving the holding means 6 in a direction parallel to an end surface of the ingot 60 held by the holding means 6, laser beam applying means 10 for applying a laser beam to the ingot 60 held by the holding means 6, imaging means 12 for imaging the ingot 60 held by the holding means 6, height detecting means 13 for detecting the height of the end surface of the ingot 60 held by the holding means 6, display means 14 for displaying an image obtained by the imaging means 12, and control means (not shown) for controlling the holding means 6, the moving means 8, the laser beam applying means 10, the imaging means 12, the height detecting means 13, and the display means 14.

The holding means 6 includes a rectangular X movable plate 20 mounted on the base 4 so as to be movable in an X direction, a rectangular Y movable plate 22 mounted on the X movable plate 20 so as to be movable in a Y direction, and a cylindrical chuck table 24 rotatably mounted on the upper surface of the Y movable plate 22. The X direction is defined as the direction shown by an arrow X in FIG. 1, and the Y direction is defined as the direction shown by an arrow Y in FIG. 1, which is perpendicular to the X direction in an XY plane. The XY plane defined by the X direction and the Y direction is a substantially horizontal plane.

The moving means 8 is the means for moving the holding means 6 in a direction parallel to the XY plane defined by the X direction and the Y direction. The moving means 8 includes X moving means 26 for moving the X movable plate 20 in the X direction, Y moving means 28 for moving the Y movable plate 22 in the Y direction, and rotating means (not shown) for rotating the chuck table 24 in the direction shown by an arrow 24b. The X moving means 26 includes a ball screw 30 extending in the X direction and a motor 32 for rotating the ball screw 30. The ball screw 30 is operatively connected to the X movable plate 20. The X moving means 26 is operated in such a manner that the rotary motion of the motor 32 is converted into a linear motion by the ball screw 30 and this linear motion is transmitted to the X movable plate 20, so that the X movable plate 20 is moved in the X direction along a pair of guide rails 4a provided on the base 4. Similarly, the Y moving means 28 includes a ball screw 34 extending in the Y direction and a motor 36 for rotating the ball screw 34. The ball screw 34 is operatively connected to the Y movable plate 22. The Y moving means 28 is operated in such a manner that the rotary motion of the motor 36 is converted into a linear motion by the ball screw 34 and this linear motion is transmitted to the Y movable plate 22, so that the Y movable plate 22 is moved in the Y direction along a pair of guide rails 20a provided on the X movable plate 20. Although not shown, each of the X moving means 26, the Y moving means 28, and the rotating means is provided with position detecting means. The position detecting means in the X moving means 26 functions to accurately detect the X position of the chuck table 24. The position detecting means in the Y moving means 28 functions to accurately detect the Y position of the chuck table 24. The position detecting means in the rotating means functions to accurately detect the rotational position of the chuck table 24. Detection signals from these position detecting means are transmitted to the control means (not shown). According to control signals output from the control means, all of the X moving means 26, the Y moving means 28, and the rotating means can be driven to move the chuck table 24 to an arbitrary position and rotate it at an arbitrary angle.

The laser beam applying means 10 includes an L-shaped casing 38 provided on the base 4 at its rear end portion, laser oscillating means (not shown) built in the casing 38, focusing means 40 mounted on the lower surface of the casing 38 at its front end portion, and focal position adjusting means 80 for adjusting the vertical position of the focal point of a laser beam to be applied from the focusing means 40. The L-shaped casing 38 is composed of a vertical portion extending upward from the upper surface of the base 4 and a horizontal portion extending from the upper end of the vertical portion in a substantially horizontal direction. Although not shown, the laser oscillating means includes a laser oscillator for oscillating a pulsed laser beam, power adjusting means for adjusting the power of the pulsed laser beam oscillated from the laser oscillator, and frequency setting means for setting the repetition frequency of the pulsed laser beam to be oscillated from the laser oscillator. The focusing means 40 includes a focusing lens (not shown) for focusing the pulsed laser beam oscillated from the laser oscillating means.

Figure 2A:
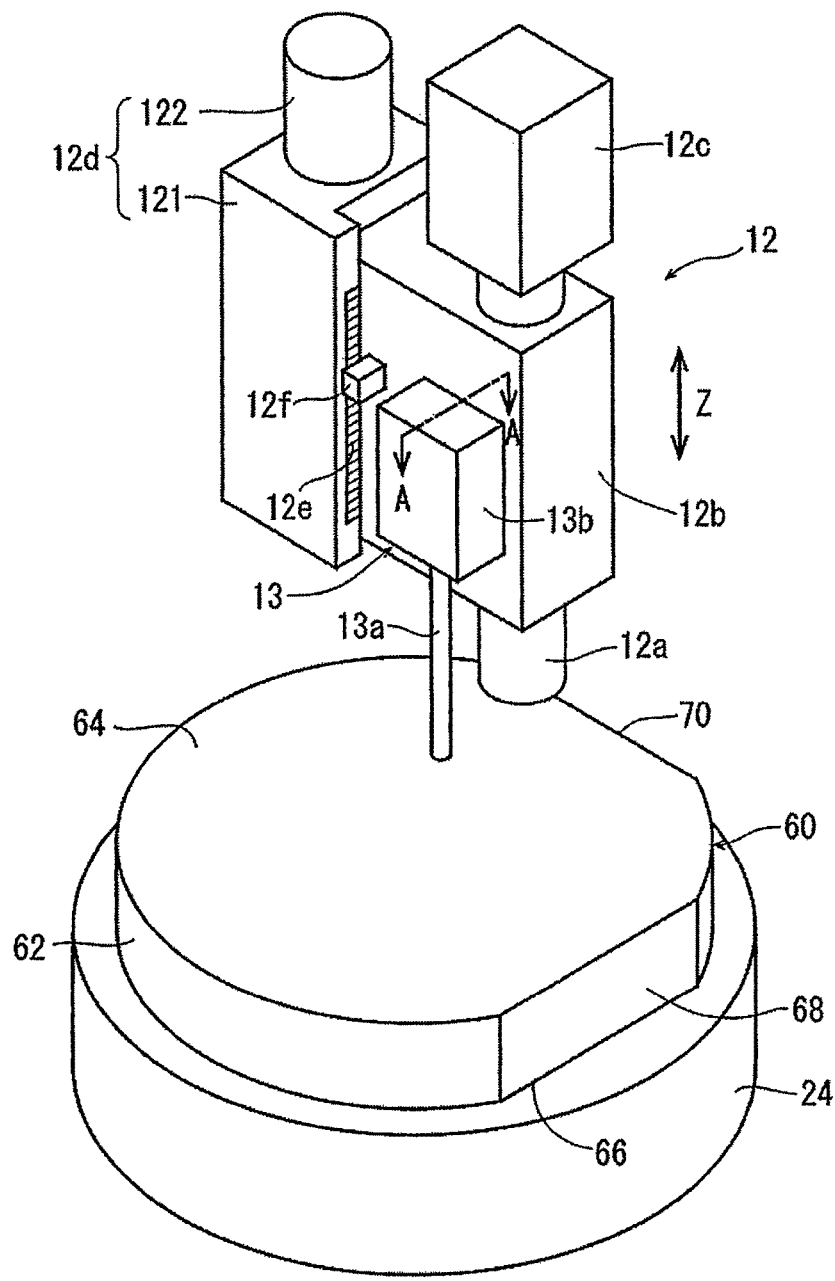
FIG. 2A is a perspective view of imaging means and height detecting means included in the laser processing apparatus shown in FIG. 1.

The imaging means 12 is provided at the corner of the front end of the casing 38 so as to be spaced from the focusing means 40 in the X direction as shown in FIG. 1. As shown in FIG. 2A, the imaging means 12 includes an objective lens unit 12a for imaging the horizontal position of the ingot 60 held on the chuck table 24 in the direction parallel to the end surface of the ingot 60, i.e., imaging the outside shape of the ingot 60, a housing 12b for holding the objective lens unit 12a, an imaging device (charge coupled device (CCD)) 12c for receiving light captured by the objective lens unit 12a through the housing 12b, and a moving unit 12d for moving the housing 12b in a vertical direction (Z direction shown by an arrow Z in FIG. 2A) to thereby move the objective lens unit 12a and the imaging device 12c in the Z direction.

The moving unit 12d is composed of a case 121 for supporting the housing 12b, the case 121 containing a drive mechanism (not shown) for moving the housing 12b in the Z direction, and a motor 122 for driving the drive mechanism contained in the case 121. The case 121 is provided with a scale 12e for detecting the amount of movement of the housing 12b in the Z direction. On the other hand, a detection terminal 12f for reading the graduations on the scale 12e to thereby detect the Z position of the housing 12b is provided on the side surface of the housing 12b so as to be opposed to the scale 12e. In the case of imaging the workpiece by using the imaging means 12, the vertical position of the housing 12b is measured by the scale 12e and the detection terminal 12f, and the moving unit 12d is operated to adjust the Z position of the objective lens unit 12a, thereby adjusting the focal position of the objective lens unit 12a. The drive mechanism contained in the case 121 may be configured by guide rails, a ball screw mechanism, etc. as similar to the configurations of the X moving means 26 and the Y moving means 28.

Figure 2B:
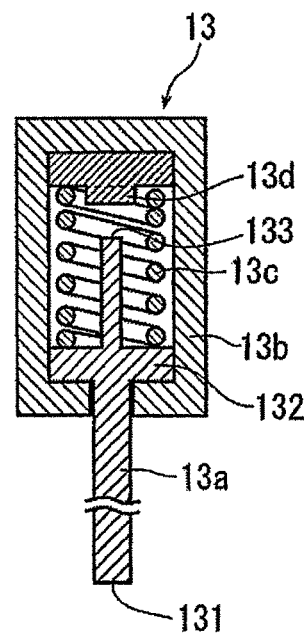
FIG. 2B is a vertical sectional view of the height detecting means shown in FIG. 2A.

As shown in FIG. 2A, the height detecting means 13 may be integrated with the housing 12b of the imaging means 12. As shown in FIG. 2B, which is a cross section taken along the line A-A in FIG. 2A, the height detecting means 13 is composed of a contact terminal 13a, a case 13b for holding the contact terminal 13a, a spring 13c contained in the case 13b for biasing the contact terminal 13a downwardly, and a switch 13d provided in the inside space of the case 13b at its upper end portion, in which the contact terminal 13a is located adjacent the imaging means 12.

The contact terminal 13a has a front end (lower end) 131, a rear end (upper end) 133, and a flange 132 formed between the front end 131 and the rear end 133. The front end 131 extends downward from the lower end surface of the case 13b. The flange 132 is located in the inside space of the case 13b so as to receive a biasing force of the spring 13c. The rear end 133 is also located in the inside space of the case 13b, and the switch 13d is located at the upper end of the inside space of the case 13b in such a manner that a small gap is defined between the rear end 133 and the switch 13d in a normal condition shown in FIG. 2B where nothing is in contact with the front end 131. When the contact terminal 13a is moved upward in the case 13b and rear end 133 of the contact terminal 13a comes into contact with the switch 13d, the switch 13d generates an ON signal and then transmits the ON signal to the control means (not shown).

The control means is configured by a computer. Although not shown, the control means includes a central processing unit (CPU) for computing according to a control program, a read only memory (ROM) previously storing the control program, a random access memory (RAM) for temporarily storing detection values, operation results, etc., an input interface, and an output interface.

There will now be described a wafer producing method using the laser processing apparatus 2 having the above configuration and the operation of the height detecting means 13.

The ingot 60 to be processed by the laser processing apparatus 2 is a hexagonal single crystal SiC ingot. As shown in FIG. 2A, the ingot 60 has a substantially cylindrical shape composed of a substantially cylindrical surface 62, an upper end surface 64, and a lower end surface 66. The substantially cylindrical surface 62 has a first orientation flat 68 for indicating a crystal orientation and a second orientation flat 70 for indicating a direction perpendicular to a direction of inclination of a C-axis in the ingot 60. Each of the first and second orientation flats 68 and 70 has a rectangular shape as viewed in side elevation. The first and second orientation flats 68 and 70 are different in length as viewed in plan for the purpose of easy discrimination.

Prior to holding the ingot 60 on the chuck table 24 and starting the processing in the laser processing apparatus 2, the height Z1 of the chuck table 24 (the height of the upper surface 24a of the chuck table 24) is detected by using the height detecting means 13 as shown in FIG. 3A. More specifically, the height detecting means 13 is previously set at a standby position where the front end (lower end) 131 of the contact terminal 13a is higher in level than the upper surface 24a of the chuck table 24 by a predetermined distance. That is, the height detecting means 13 and the imaging means 12 united each other are previously set at this standby position. Thereafter, the moving means 8 is operated to move the chuck table 24 so that the center of the chuck table 24 is positioned directly below the front end 131 of the contact terminal 13a of the height detecting means 13. Thereafter, the motor 122 of the moving unit 12d is operated to lower the height detecting means 13. At this time, the height detecting means 13 is lowered at a low speed, so as to prevent that the front end 131 of the contact terminal 13a may sharply collide with the upper surface 24a of the chuck table 24 to cause damage or the like.

As described above with reference to FIG. 2B, the contact terminal 13a is normally biased downward by the spring 13c provided in the case 13b. When the contact terminal 13a is lowered to reach the chuck table 24, i.e., when the front end 131 of the contact terminal 13a comes into contact with the upper surface 24a of the chuck table 24, the downward movement of the contact terminal 13a is stopped. Thereafter, the case 13b is further lowered, so that the switch 13d provided in the case 13b is lowered by the small gap defined between the rear end 133 of the contact terminal 13a and the switch 13d. When the switch 13d comes into contact with the rear end 133 of the contact terminal 13a, an ON signal is generated from the switch 13d. Thereafter, when the ON signal is transmitted to the control means (not shown), a stop signal is immediately transmitted from the control means to the motor 122 to thereby stop the operation of the motor 122 and accordingly stop the lowering of the height detecting means 13 (see FIG. 3A).

When the lowering of the height detecting means 13 is stopped as mentioned above, the graduation on the scale 12e at this time is read by the detection terminal 12f to measure the vertical position of the front end 131 of the contact terminal 13a. A detection value (Z1) obtained by the detection terminal 12f is transmitted to the control means, and this detection value is stored as the height Z1 of the chuck table 24 by the control means. Thereafter, the motor 122 is operated to raise the height detecting means 13 to the standby position mentioned above.

After detecting the height Z1 of the chuck table 24 and setting the height detecting means 13 to the standby position as mentioned above, the ingot 60 is placed on the chuck table 24 in the condition where the center of the ingot 60 coincides with the center of the chuck table 24, and an adhesive (e.g., epoxy resin adhesive) is interposed between the upper surface 24a of the chuck table 24 and the lower end surface 66 of the ingot 60. As a modification, the upper surface 24a of the chuck table 24 may be formed of a porous material to form a circular vacuum chuck having a substantially horizontal holding surface, and this vacuum chuck may be connected to suction means (not shown) for producing a vacuum. In this case, the ingot 60 can be held on the chuck table 24 under suction.

After setting the ingot 60 on the chuck table 24, the operation of the height detecting means 13 mentioned above is performed in a similar manner to detect the height Z2 of the upper end surface 64 of the ingot 60 held on the chuck table 24. More specifically, as shown in FIG. 3B, the height detecting means 13 is lowered from the standby position toward the ingot 60 held on the chuck table 24. When the front end 131 of the contact terminal 13a comes into contact with the upper end surface 64 of the ingot 60, the vertical position of the front end 131 of the contact terminal 13a, or the height Z2 of the upper end surface 64 of the ingot 60 is detected by the detection terminal 12f and then stored into the control means. After detecting the height Z1 of the upper surface 24a of the chuck table 24 and the height Z2 of the upper end surface 64 of the ingot 60 as mentioned above, the thickness (Z2−Z1) of the ingot 60 is calculated. The reference position (origin) on the scale 12e is previously set lower than the height of the chuck table 24 by a predetermined amount so as to prevent that the detection value by the detection terminal 12f may become a negative value.

After calculating the thickness (Z2−Z1) of the ingot 60 as mentioned above, an alignment step is performed to make the alignment between a target position on the ingot 60 where processing of the ingot 60 is started and the position of the focusing means 40 of the laser beam applying means 10. More specifically, the alignment step is performed in the following manner. First, the moving means 8 is operated to move the chuck table 24 to the position below the imaging means 12, and the whole of the ingot 60 held on the chuck table 24 is imaged by the imaging means 12. At this time, the height of the imaging means 12 is detected by the scale 12e and the detection terminal 12f, and the motor 122 of the moving unit 12d is operated to move the imaging means 12 to a suitable position where the ingot 60 can be properly imaged. An image of the ingot 60 obtained by the imaging means 12 is displayed on the display means 14, and the shape of the upper end surface 64 of the ingot 60 is grasped according to the image displayed. Further, the positions and directions of the first and second orientation flats 68 and 70 of the ingot 60 are detected. Since the first and second orientation flats 68 and 70 are different in length as viewed in plan as described above, the first and second orientation flats 68 and 70 can be easily discriminated from each other.

Figure 4:
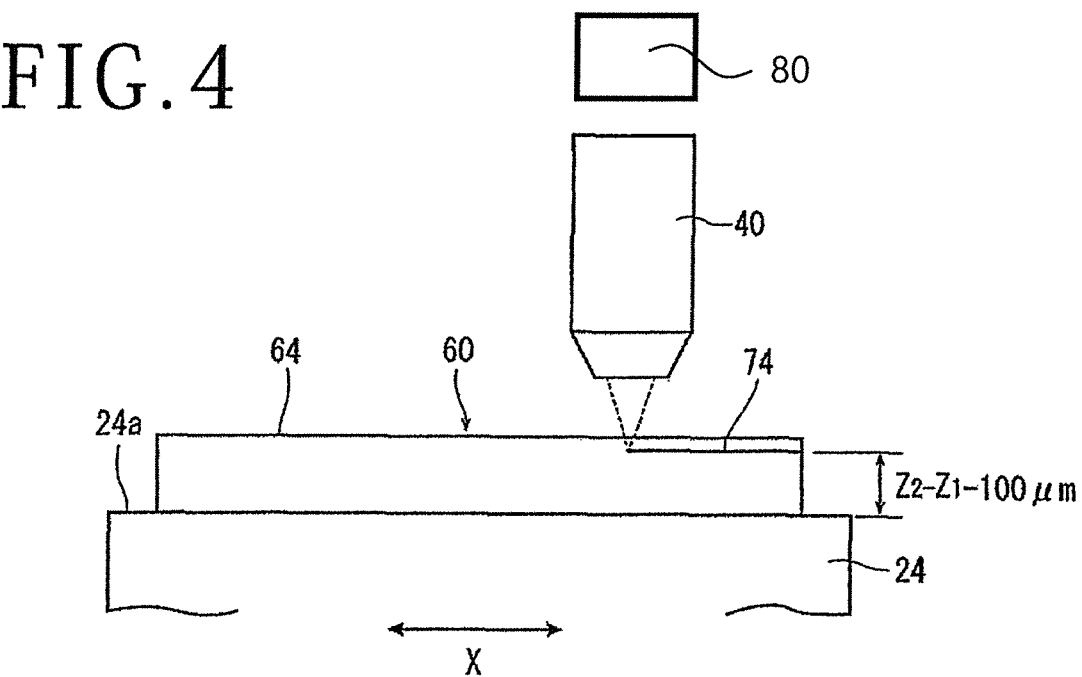
FIG. 4 is a side view for illustrating a focal position adjusting step of adjusting the focal point of a laser beam to a predetermined depth in an ingot by the operation of laser beam applying means included in the laser processing apparatus shown in FIG. 1.

After detecting the first and second orientation flats 68 and 70, the moving means 8 is operated to make the second orientation flat 70 parallel to the X direction and also to align the target start position on the ingot 60 with the focusing means 40. Thereafter, the focal position adjusting means 80 in the laser beam applying means 10 is operated to move the focusing means 40 in the Z direction, thereby adjusting the focal point of a laser beam to a predetermined depth (e.g., 100 μm) from the upper end surface 64 of the ingot 60 according to the thickness of a wafer to be separated from the ingot 60. At this time, the focal point is set with reference to the height Z1 of the chuck table 24 and the height Z2 of the ingot 60 as previously detected. That is, as shown in FIG. 4, the Z position of the focusing means 40 is adjusted so that the focal point of the laser beam is set at a height of (Z2−Z1−100 μm) from the upper surface 24a of the chuck table 24.

Figure 5:
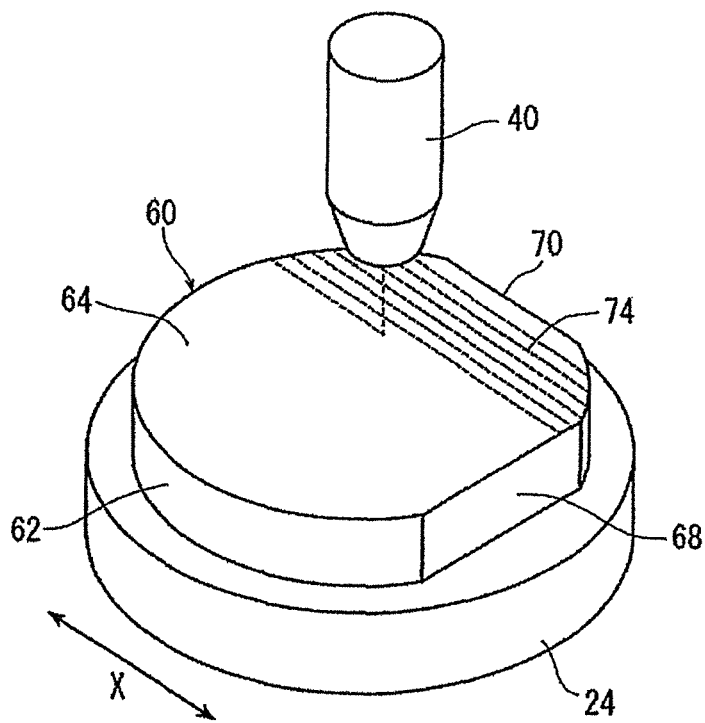
FIG. 5 is a perspective view for illustrating a separation layer forming step to be performed by the laser processing apparatus shown in FIG. 1.

After performing the alignment step as mentioned above, a separation layer forming step is performed to form a separation layer inside the ingot 60. As shown in FIGS. 4 and 5, the separation layer forming step is performed by applying a laser beam having a transmission wavelength to single crystal SiC from the focusing means 40 to the ingot 60 as operating the X moving means 26 to move the chuck table 24 at a predetermined feed speed in the X direction (i.e., in the direction parallel to the second orientation flat 70). More specifically, the separation layer forming step includes a strength reduced portion forming step of forming a strength reduced portion 74 at the depth of 100 μm from the upper end surface 64 of the ingot 60 held on the chuck table 24, the strength reduced portion 74 linearly extending in the X direction, and an indexing step of indexing the chuck table 24 in the Y direction by a predetermined amount by operating the Y moving means 28, after performing the strength reduced portion forming step. The strength reduced portion forming step and the indexing step are repeated plural times. Accordingly, a plurality of strength reduced portions 74 are arranged at given intervals in the Y direction, i.e., in the direction perpendicular to the second orientation flat 70 in the XY plane parallel to the upper end surface 64 of the ingot 60. The separation layer forming step may be performed under the following processing conditions.

Light source: YAG pulsed laser
Wavelength of the laser beam: 1064 nm
Repetition frequency: 80 kHz
Average power: 3.2 W
Pulse width: 3 ns
Focused spot diameter: 10 μm
Numerical aperture (NA) of the focusing lens: 0.65
Index amount: 500 μm
Feed speed: 150 mm/second
Defocus amount: 100 μm After performing the separation layer forming step, a wafer separating step is performed to separate a wafer having a thickness of 100 μm from the ingot 60 along the separation layer as an interface as formed in the separation layer forming step. The wafer separating step is not essential in the present invention, and the detailed description thereof will therefore be omitted. For example, the wafer separating step may be performed in the following manner. First, a suction member is brought into close contact with the upper end surface 64 of the ingot 60, and suction means is operated to apply a vacuum to the suction member, thereby holding the ingot 60 to the suction member under suction. Thereafter, ultrasonic vibration is applied from the suction member to the ingot 60 to thereby grow the separation layer formed in the separation layer forming step. As a result, the wafer can be separated from the ingot 60 along the separation layer as an interface.

After performing the wafer separating step, a polishing step is performed to polish the new upper end surface of the ingot 60 by using polishing means (not shown) provided on the base 4. Accordingly, the remaining ingot 60 can be used to produce a wafer again. That is, the height detecting means 13 is lowered toward the ingot 60 held on the chuck table 24 until the front end 131 of the contact terminal 13a comes into contact with the new upper end surface of the ingot 60 as shown in FIG. 3B, thereby detecting the height of the new upper end surface of the ingot 60 and storing it into the control means. Thereafter, the above-mentioned steps are similarly performed with reference to the height of the new upper end surface of the ingot 60 detected above. By repeating the above operation, a plurality of wafers can be efficiently produced from the ingot 60 to thereby improve the productivity. The height Z1 of the chuck table 24 is not required to be detected again because it is not changed even after the separation of a wafer from the ingot 60. For example, the height Z1 of the chuck table 24 may be detected and stored once at the start of daily work or at starting the operation of the laser processing apparatus 2.

The present invention is not limited to the above preferred embodiment, but various modifications may be made within the scope of the present invention. For example, while the height detecting means 13 is located adjacent to the imaging means 12 in the above preferred embodiment, the height detecting means 13 may be located at the front end of the casing 38 independently of the imaging means 12. Further, the height Z2 of the upper end surface 64 of the ingot 60 is detected by measuring the Z position at the center of the upper end surface 64 of the ingot 60 in the above preferred embodiment. As a modification, a plurality of Z positions at a plurality of points on the upper end surface 64 may be detected and the average of these plural Z positions detected may be adopted as the height Z2.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus for forming a separation layer inside an ingot by applying a laser beam to an end surface of said ingot in a condition where a focal point of said laser beam is set inside said ingot, said laser beam having a transmission wavelength to said ingot, said laser processing apparatus comprising:
    holding means for holding said ingot;
    moving means for moving said holding means in a direction parallel to the end surface of said ingot held by said holding means;
    laser beam applying means for applying said laser beam to said ingot held by said holding means, said laser beam applying means having focusing means for focusing said laser beam so that the focal point is movable in a direction perpendicular to the end surface of said ingot held by said holding means;
    imaging means for detecting a position of said ingot in a direction parallel to the end surface of said ingot held by said holding means;
    height detecting means for detecting a height of the end surface of said ingot held by said holding means; and
    focal position adjusting means for adjusting the focal point of said laser beam to a predetermined depth from the end surface of said ingot held by said holding means according to a detection value obtained by said height detecting means, said predetermined depth corresponding to the thickness of a wafer to be produced from said ingot.

2. The laser processing apparatus according to claim 1, wherein said height detecting means includes a contact terminal, a moving unit for moving said contact terminal until said contact terminal comes into contact with the end surface of said ingot held by said holding means, and a scale for detecting the position of said contact terminal.

3. The laser processing apparatus according to claim 2, wherein said contact terminal is provided adjacent to said imaging means, and said scale and said moving unit are included in said imaging means.

4. A method for forming a separation layer inside an ingot using a laser processing apparatus by applying a laser beam to an end surface of said ingot in a condition where a focal point of said laser beam is set inside said ingot, said laser beam having a transmission wavelength to said ingot, the method comprising the acts of:
    holding said ingot using a holding means;
    moving said holding means in a direction parallel to the end surface of said ingot held by said holding means;
    applying said laser beam to said ingot held by said holding means, wherein said laser beam is focused so that the focal point is movable in a direction perpendicular to the end surface of said ingot held by said holding means;
    detecting a position of said ingot in a direction parallel to the end surface of said ingot held by said holding means;
    detecting a height of the end surface of said ingot held by said holding means; and
    adjusting the focal point of said laser beam to a predetermined depth from the end surface of said ingot held by said holding means according to a detection value obtained by said act of detecting the height of the end surface, said predetermined depth corresponding to the thickness of a wafer to be produced from said ingot.

5. The method according to claim 4, wherein said act of detecting the height of the end surface is performed by a height detecting means that includes a contact terminal, the method further comprising the act of:
    moving said contact terminal until said contact terminal comes into contact with the end surface of said ingot held by said holding means, and
    detecting the position of said contact terminal when said contact terminal comes into contact with the end surface of said ingot.

6. The method according to claim 5, wherein said act of detecting a position of said ingot is performed by imaging means; wherein said act of detecting the position of said contact terminal when said contact terminal comes into contact with the end surface of said ingot is performed using a scale; and wherein said act of moving said contact terminal is performed by a moving unit,
    wherein said contact terminal is provided adjacent to said imaging means, and said scale and said moving unit are included in said imaging means.

* * * * *